(12) United States Patent
Talmage, Jr.

(10) Patent No.: US 7,946,530 B1
(45) Date of Patent: May 24, 2011

(54) MODULAR ADAPTIVE CONFIGURED HELICOPTER

(76) Inventor: Robert N. Talmage, Jr., Acworth, GA (US)

( * ) Notice: Subject to any disclaimer, the term of this patent is extended or adjusted under 35 U.S.C. 154(b) by 915 days.

(21) Appl. No.: 11/345,175

(22) Filed: Feb. 2, 2006

Related U.S. Application Data

(60) Provisional application No. 60/689,847, filed on Jun. 13, 2005.

(51) Int. Cl.
*B64D 25/12* (2006.01)
(52) U.S. Cl. .................... 244/118.2; 244/2; 244/140
(58) Field of Classification Search .......... 244/2, 7 A, 244/137.1, 138 R, 139, 140, 142, 144, 147, 244/118.2
See application file for complete search history.

(56) References Cited

U.S. PATENT DOCUMENTS

| | | | | |
|---|---|---|---|---|
| 2,427,167 A | * | 9/1947 | Thompson et al. | 83/175 |
| 3,028,130 A | * | 4/1962 | Burton | 244/137.1 |
| D193,492 S | * | 8/1962 | Howard et al. | D12/327 |
| 3,176,940 A | * | 4/1965 | Echeverria, Jr. | 244/118.1 |
| 3,212,737 A | * | 10/1965 | Katzenberger | 244/137.1 |
| 3,227,399 A | * | 1/1966 | Dastoli et al. | 244/2 |
| 3,298,633 A | * | 1/1967 | Dastoli et al. | 244/2 |
| 3,377,037 A | * | 4/1968 | Stewart | 244/17.15 |
| 3,389,880 A | * | 6/1968 | Ferguson | 244/137.1 |
| 4,267,987 A | * | 5/1981 | McDonnell | 244/2 |
| 4,379,533 A | * | 4/1983 | Caldwell et al. | 244/118.1 |
| 4,458,864 A | * | 7/1984 | Colombo et al. | 244/118.5 |
| 4,895,321 A | * | 1/1990 | Huhn et al. | 244/118.2 |
| 5,356,097 A | * | 10/1994 | Chalupa | 244/139 |
| 6,554,227 B2 | * | 4/2003 | Wolter | 244/140 |
| 6,761,334 B1 | * | 7/2004 | Nutu et al. | 244/140 |
| 7,056,167 B1 | * | 6/2006 | Talmage, Jr. | 440/12.5 |
| 7,234,667 B1 | * | 6/2007 | Talmage, Jr. | 244/120 |
| 2005/0077429 A1 | * | 4/2005 | Beauchamp | 244/142 |

FOREIGN PATENT DOCUMENTS

FR 2610254 A1 * 8/1988

* cited by examiner

*Primary Examiner* — Michael R Mansen
*Assistant Examiner* — Brian M O'Hara
(74) *Attorney, Agent, or Firm* — Rodgers & Rodgers

(57) ABSTRACT

A method and apparatus for a composite helicopter comprising a rotary wing parent vehicle with various modular cabins detachable therefrom to facilitate various configuration aircraft platforms, dual operation and modular economy.

6 Claims, 9 Drawing Sheets

MODULAR ADAPTIVE CONFIGURED HELICOPTER

The benefits of U.S.C. 119 are claimed of provisional patent application 60/689,847 filed Jun. 13, 2005.

FIELD OF THE INVENTION

This invention relates to a common use helicopter platform or parent vehicle designed to integrate with a variety of different modular cabins. The individual cabins, equipped and configured for different roles, all integrate with the parent vehicle for air transportation. This helicopter design improves safety, economics, versatility and operations.

BACKGROUND OF THE INVENTION

Helicopters are typically configured to perform specific roles such as troop transportation, cargo transportation, assault, medical evacuation, surveillance, AWAC, rescue, firefighting, construction, etc. Military helicopters are often designed with interior accessories to accommodate passengers and/or cargo. Various attachments are available to mount weapons, equipment, hoists, etc. It would be desirable for one common parent vehicle comprising the rotors, engines, fuel and aircraft systems to mate with a family of various aircraft cabins configured for specific roles and missions.

Denton Delong, in U.S. Pat. No. 5,190,250 depicts an Autonomous, Heliborne-Mobile, Construction/Emergency Pod System (AHP) which attaches to a helicopter's external stores support station. The AHP system includes a Dual Cable Winch and Rack (DCWR) assembly to secure, lower and raise the AHP. The AHP contains construction and/or rescue equipment and a self-contained power source. The DCWR can deploy the AHP on the ground from a hovering helicopter or retrieve the AHP in a similar fashion.

The Sikorsky S-64 Skycrane helicopter is designed to carry external payloads primarily for construction, logging and fire fighting operations. Lee Ramage depicts a fluid loading system in U.S. Pat. No. 6,874,734, which attaches externally and is used to load fluid from a ground source while in flight and subsequently dispenses the fluid on a fire.

The nature of helicopter mechanical mechanisms and operations creates considerable vibration. These vibrations cause fatigue in the aircraft structural components and systems. Furthermore, these vibrations are uncomfortable for the occupants and may contribute to pilot fatigue and performance. Much effort has been done to minimize these vibrations in modern helicopters; however, further improvements with current techniques may have reached their limits. It would be desirable to find another technique to further reduce and isolate helicopter vibrations.

Safety is a major concern in air transportation. Military planes have used ejection seats and escape capsules to improve safety. However, these safety features have not been incorporated into helicopters.

Recently, sport aviation has introduced a Ballistic Parachute System. This system can safely lower the entire plane in an emergency. This feature has been adopted in some small general aviation aircraft to dramatically improve flight safety. Unfortunately, this system is not available on helicopters.

Robert N. Talmage, Jr. depicts an Aircraft Escape Cabin (AEC) in U.S. Pat. No. 6,776,373 which uses a parachute to lower the Escape Cabin. This concept avoids dangers associated with ejection seats and permits safe emergency evacuation from aircraft. The AEC evacuates multiple individuals while still protected in their seats. The AEC protects ejected occupants from the environment and parachute landings. It would be advantageous if a similar concept could be applied to helicopters.

BRIEF SUMMARY OF THE INVENTION

This invention relates to a Modular Adaptive Configured Helicopter (MACH) designed to integrate with different modular cabins to offer a helicopter platform with a wide variety of configurations. In this manner, one common helicopter structure or parent vehicle with engines, fuel, aircraft systems and lift devices may integrate with different modular cabins to satisfy special mission requirements. This modular cabin may be designed for passengers, crew, weapons, cargo, surveillance, electronics, medical evacuation or any other specific purpose. These modular cabins are designed to attach and detach in field conditions with minimal support equipment and available personnel. Specific modular cabins can be attached with explosive bolts or mechanical devices which can be released in an emergency whereby the cabin will separate from the parent vehicle and safely parachute the cabin and occupants to the ground.

It is the primary objective of the present invention to provide a common use helicopter configuration or parent vehicle, which can integrate with a variety of different modular cabins to satisfy specific mission objectives and offer a failsafe feature for the occupants of the cabin.

It is another objective of the present invention to provide a MACH whereby the modular cabin integrates with the parent vehicle to form a streamlined aircraft with minimum drag.

Yet another object of the present invention is to provide a modular cabin which may include the cockpit.

Still another object of the present invention is to provide a modular cabin which may include landing gear.

It is another objective of the present invention to provide a modular cabin which can operate independently of the parent vehicle on land or water. These modular cabins would contain the necessary power, fuel, suspension, controls, systems and structure to function as a watercraft, land vehicle or an amphibious vehicle.

A further object of the present invention is to provide a MACH whereby the parent vehicle can operate without a modular cabin attached. One method involves the cockpit being incorporated into the parent vehicle and designed for the proper weight and balance of the parent vehicle while operating without the modular cabin attached. Another method is to design the parent vehicle to fly unmanned by remote control when unattached from the modular cabin.

Yet one more object of the present invention is to provide a modular cabin with emergency release means to separate from the parent vehicle. This release will sever all connecting electrical and mechanical lines. A static line attached to the parent vehicle will extract a parachute to deploy and safely parachute the modular cabin to the ground.

Another objective of the present invention is to provide the modular cabin with a parachute device and wheels or skids to decelerate the cabin upon contact with the ground.

Yet, another object of the present invention is to provide a door to provide ingress and egress from the modular cabin.

Still another objective of the present invention is to provide a door in the modular cabin to access areas in the parent vehicle.

Still another objective of the present invention is to provide a window in the modular cabin for visibility.

Yet, another object of the present invention is to provide a means to connect and disconnect electrical and mechanical lines, which connect components in the modular cabin with other components in the parent vehicle.

A further object of the present invention is to provide a means to reduce the destructive nature and discomfort of helicopter vibrations.

DETAILED DESCRIPTION OF THE INVENTION

Figure 1:
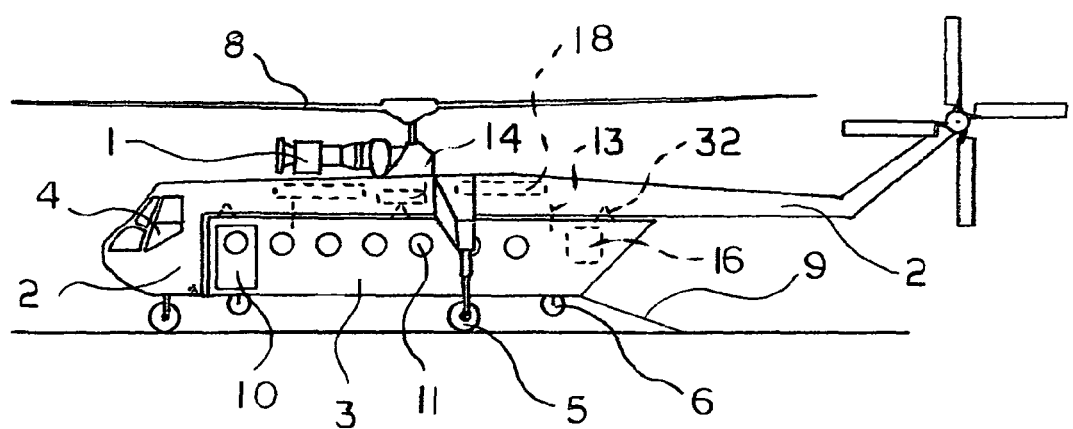
FIG. 1 is an elevational view of one embodiment of the invention with the modular cabin attached to the parent vehicle.
Figure 3:
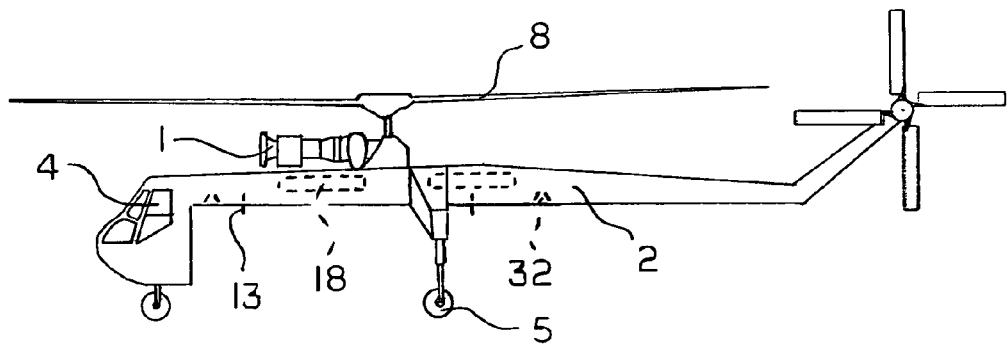
FIG. 3 is an elevational view of one embodiment of the invention illustrating the parent vehicle operating without a modular cabin attached.

Referring to the drawings wherein like referenced numerals indicate corresponding or similar elements throughout the several views, FIG. 1 illustrates a Modular Adaptive Configured Helicopter (MACH) comprising modular cabin 3 and parent vehicle 2. This specific embodiment of the invention illustrates the parent vehicle 2 which is configured with the cockpit 4 designed as part of the parent vehicle and which enables the parent vehicle to operate with or without the modular cabin 3 attached. FIG. 3 illustrates the parent vehicle 2 operating without a modular cabin attached. In this manner, the parent vehicle can drop off various modular cabins and fly without a modular cabin to transport another modular cabin, carry a suspended load, transport a BOOT-V (reference patent application Ser. No. 10/683,710) or operate as an independent helicopter.

Figure 2:
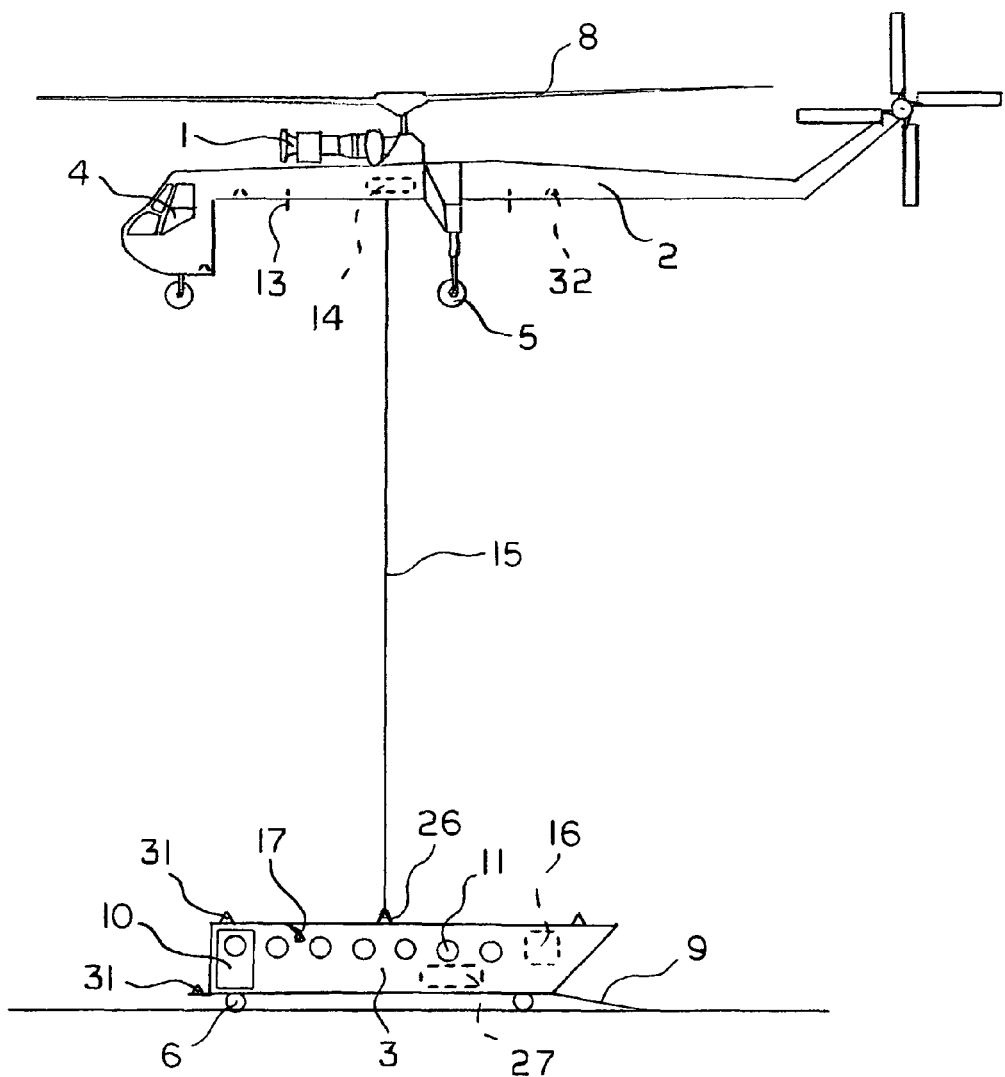
FIG. 2 is an elevational view of one embodiment of the invention with the modular cabin attached by a cable to the parent vehicle.

Parent vehicle 2 of FIG. 1 has landing gear 5 and all necessary aircraft systems to conduct helicopter missions with or without a modular cabin attached. It contains a cable winch device 14 to raise and lower suspended loads. Furthermore, cable winch device 14 enables the parent vehicle 2 to deploy or retrieve modular cabin 3 without having to land the MACH. Using cable winch device 14, the MACH can hover above an inaccessible or dangerous area and lower the modular cabin safely to the ground. After the modular cabin is on the ground, cable 15 in FIG. 2 can be detached from lifting tackle 26. In a similar fashion, the parent vehicle can hover above a modular cabin, attach cable 15 to lifting tackle 26, lift the modular cabin in the air, and fly it to another destination.

The MACH can connect or mate with various modular cabins by hovering down onto the modular cabin 3, rolling above the modular cabin or sliding the modular cabin under the parent vehicle 2. Cone shaped matting devices illustrated in FIG. 10 correctly position the parent vehicle and modular cabin to engage attachment/release device 13.

Electrical connector 17 is plugged into the parent vehicle, which connects the electrical systems of the parent and the modular cabin. These electrical systems may include power, communications, data, avionics, weapons systems, controls, etc. The static line 24 from parachuting device 16 is connected to the parent vehicle. The parachute is connected to lifting tackle 26. In case of an in-flight emergency, the modular cabin can separate from the parent vehicle and parachute to the ground. Emergency separation can be accomplished by using explosive bolts in the attachment device 13 or a mechanical system to release the attachment device 13. Those skilled in the art of attachment devices and devices specifically designed for emergency separation can provide such attachment devices to satisfy the MACH criteria.

Modular cabin wheel 6 can be designed into various modular cabins for mobility on the ground. These modular cabin wheels can be electrically powered and controlled by an operator to maneuver the modular cabin on land. A remote control device can be used to maneuver the modular cabin unmanned from a remote location. A similar remote control device may also be used by an operator outside the modular cabin to facilitate the mating of the modular cabin and parent vehicle.

Aircraft engine 1 powers the main rotor 8. The parent vehicle incorporates fuel tank 18 to carry fuel for engine 1. The modular cabin can receive electrical power from the parent vehicle electrical systems and/or utilizing its own generator 27 or fuel cell as a power source.

Modular cabin door 10 provides egress to the cabin. Corresponding doors in the parent vehicle and modular cabin can provide egress between the two MACH components. Large cargo door 9 is hinged with a ramp to open downward and easily load and unload cargo. Modular cabin view port 11 provides visibility and interior light.

Figure 4:
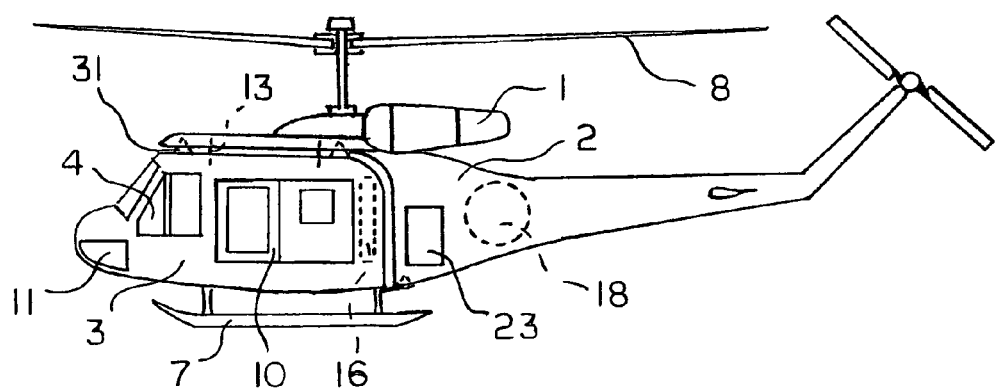
FIG. 4 is an elevational view of one embodiment of the invention with a modular cabin containing the cockpit and attached to the parent vehicle for normal operations.

FIG. 4 illustrates a MACH configured with the cockpit 4 as part of the modular cabin 3 and not part of the parent vehicle 2. Those skilled in the art can provide the necessary connections between the cockpit and parent vehicle for all aircraft controls and systems. Built into these mechanical and electrical connections between the modular cabin and parent vehicle are the means to quickly separate these lines in an emergency to release modular cabin 3.

One feature of the MACH embodied in FIG. 4 is the ability for the pilots in the cockpit to safely parachute with the modular cabin in an emergency. In this particular MACH configuration, the pilots can quickly and safely escape an inflight emergency while secured and protected in their seats.

As shown in FIG. 1, the MACH pilots located in the parent vehicle, such have two emergency options. One option is to leave their seats in an emergency to enter the modular cabin prior to emergency separation. The other option is for the pilot to remain with the parent vehicle and attempt an emergency landing after releasing the modular cabin.

FIG. 4 illustrates a MACH configured with modular cabin skids 7. These skids function as support for the modular cabin independently and for the complete MACH. Those skilled in the art will provide temporary support of the parent vehicle in FIG. 4 when it is not attached to a modular cabin. Access door 23 provides access to areas inside the parent vehicle.

Figure 5:
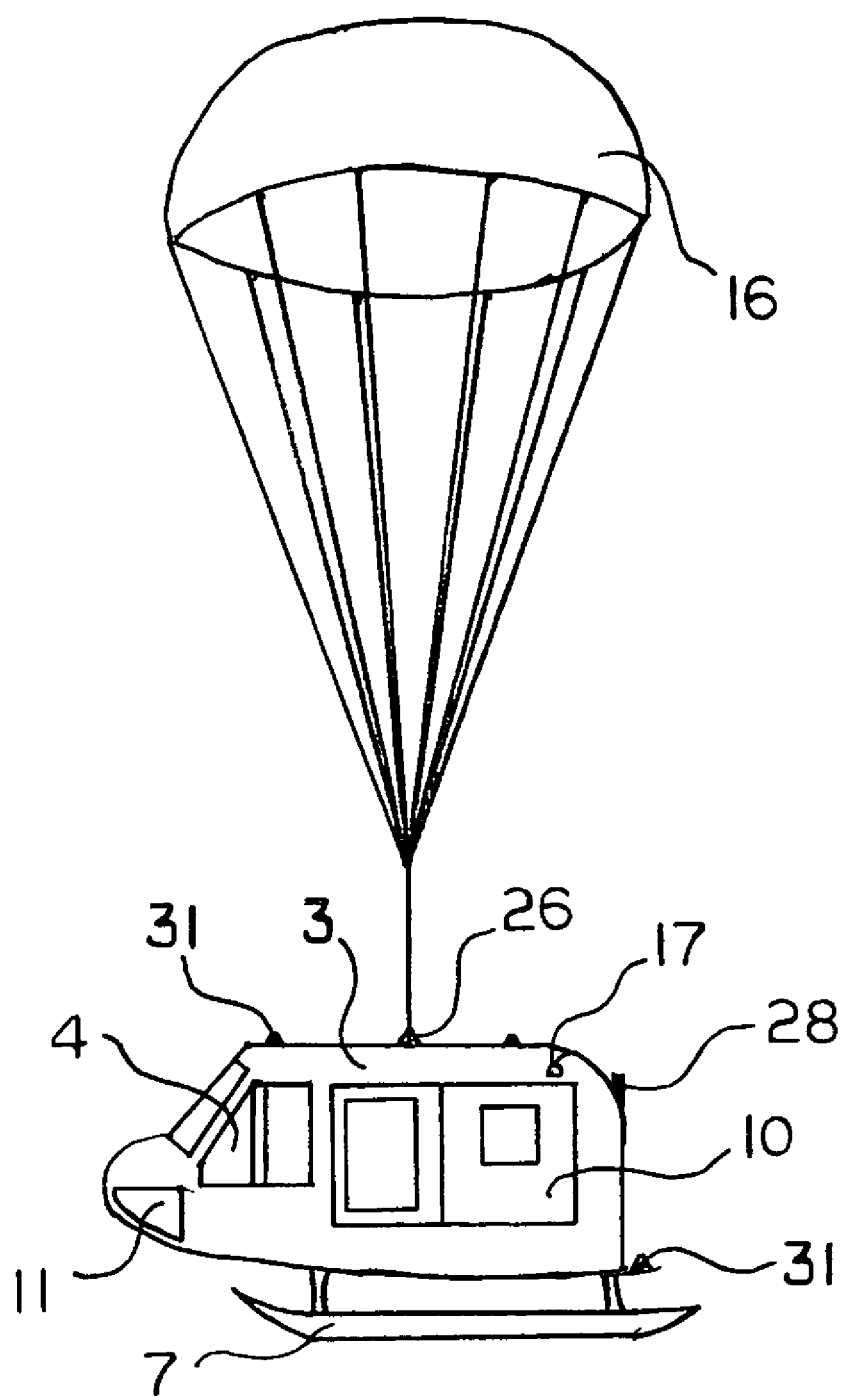
FIG. 5 is an elevational view of one embodiment of the invention illustrating the modular cabin of FIG. 4 separated from the parent vehicle after an emergency with the parachute deployed.
Figure 6:
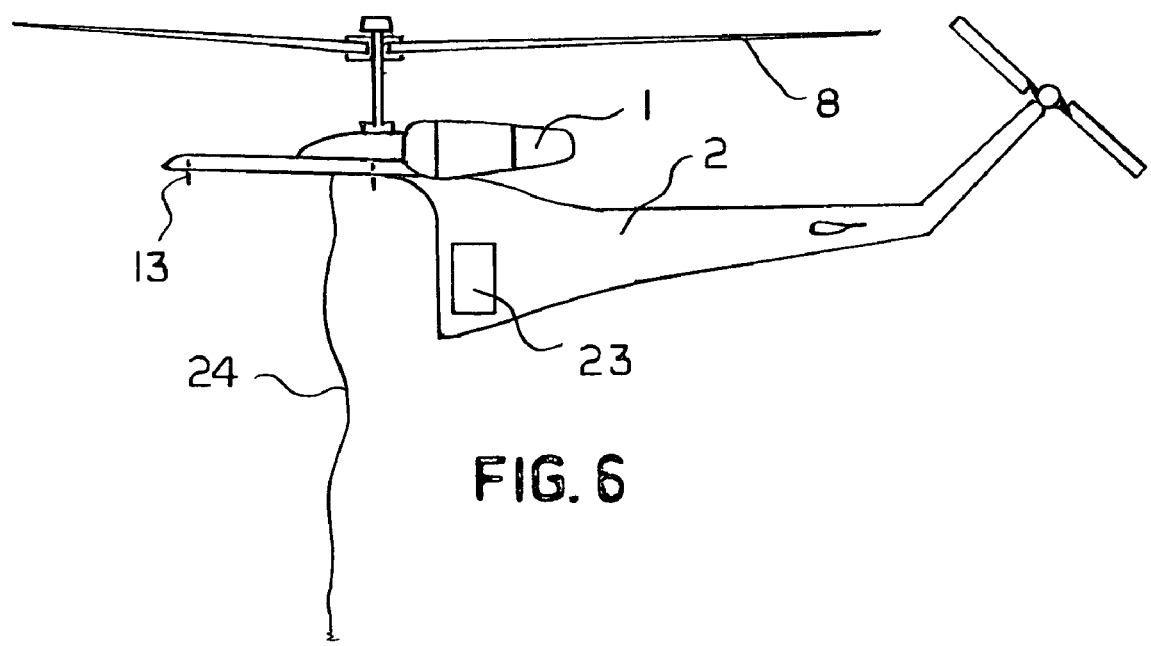
FIG. 6 is an elevational view of one embodiment of the invention illustrating the parent vehicle of FIG. 4 after the modular cabin has been released in an emergency.

FIG. 5 illustrates modular cabin 3 after emergency separation. The static line 24 in FIG. 6 has extracted the parachute device 16. In FIG. 5, the parachute device is fully deployed and attached to the modular cabin lifting tackle 26. Attachment device 13 is detached and mechanical connectors 28 and electrical connectors 17 have been pulled apart by the emergency separation or severed by incendiary devices. Landing skids 7 are designed to absorb the landing impact.

Figure 7:
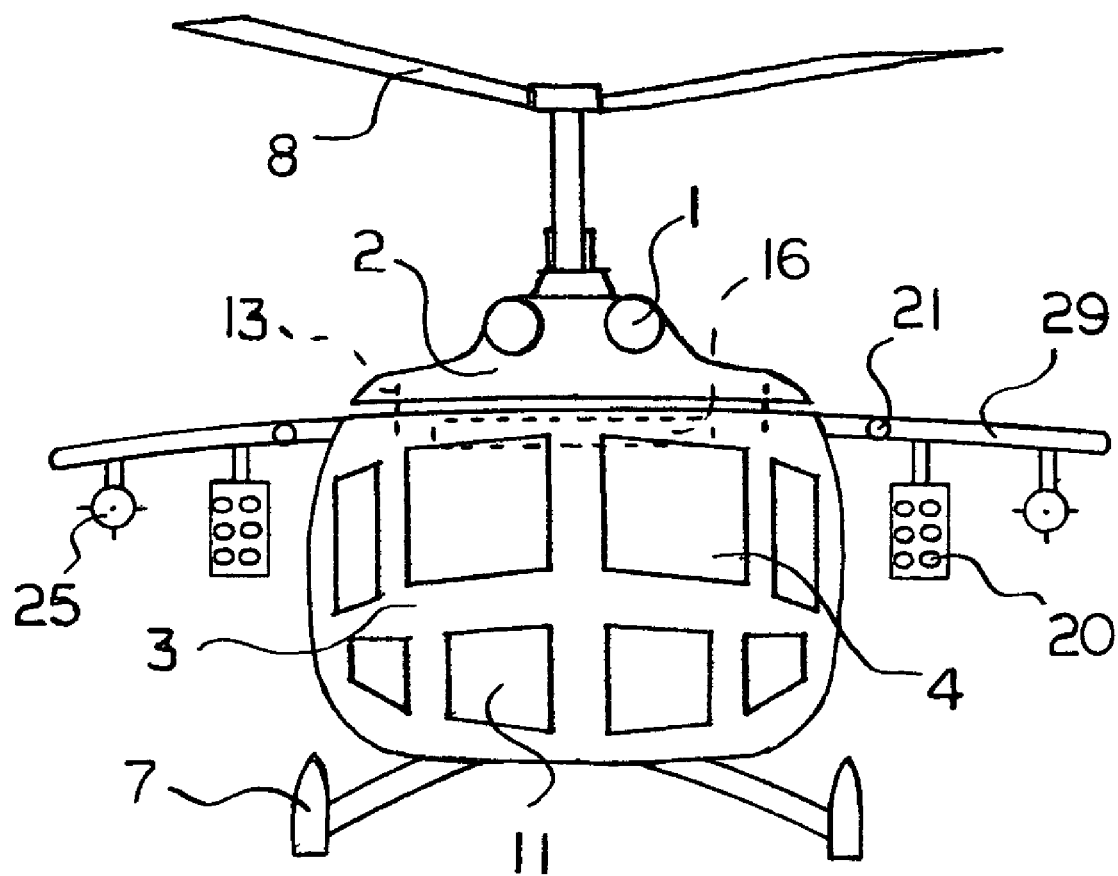
FIG. 7 is an elevational view of one embodiment of the invention illustrating a modular cabin configured with external stores support stations.

FIG. 7 illustrates a MACH configured with the cockpit 4 as part of the modular cabin 3. This specific modular cabin 3 is configured as an attack helicopter with external stores support wing 29 as an integral component of the modular cabin. Various external stores 25 may be attached to the external stores support wing 29 such as rocket launcher 20, machine gun 21, fuel tanks, etc.

Figure 8:
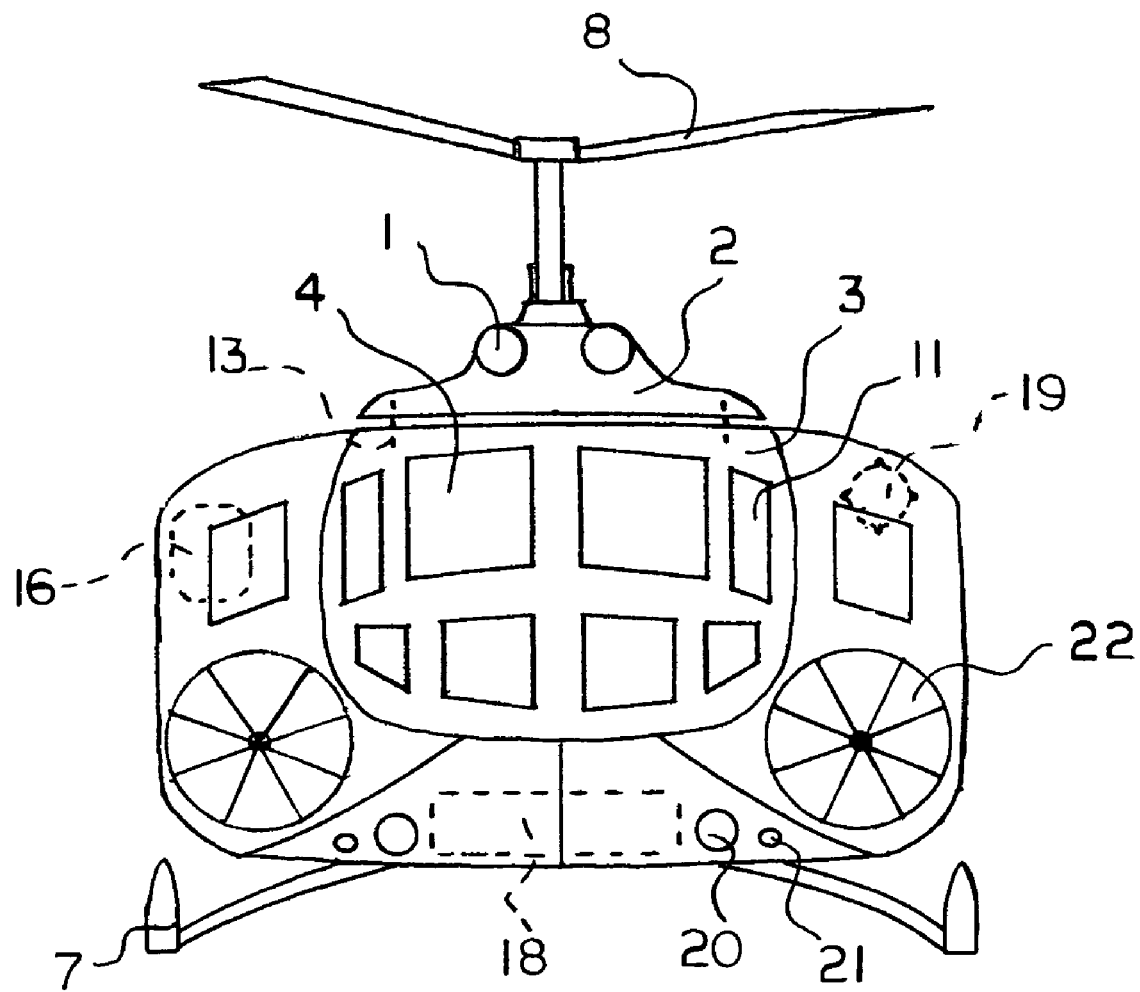
FIG. 8 is an elevational view of one embodiment of the invention illustrating a modular cabin configured for oversized cargo and equipment.

FIG. 8 illustrates a MACH configured with an enlarged modular cabin 3 to accommodate large electronic weapons 22, antennas, sensors, etc. Superconducting Magnetic Energy Storage (SMES) device 19 makes possible a large burst of power to fire electronic weapons. Fuel tank 18 supplements normal fuel reserve in the parent vehicle to increase range and endurance. This fuel may also be available for the cabin equipment. Rocket launcher 20 and machine gun 21 are easily incorporated into the modular cabin.

Figure 9:
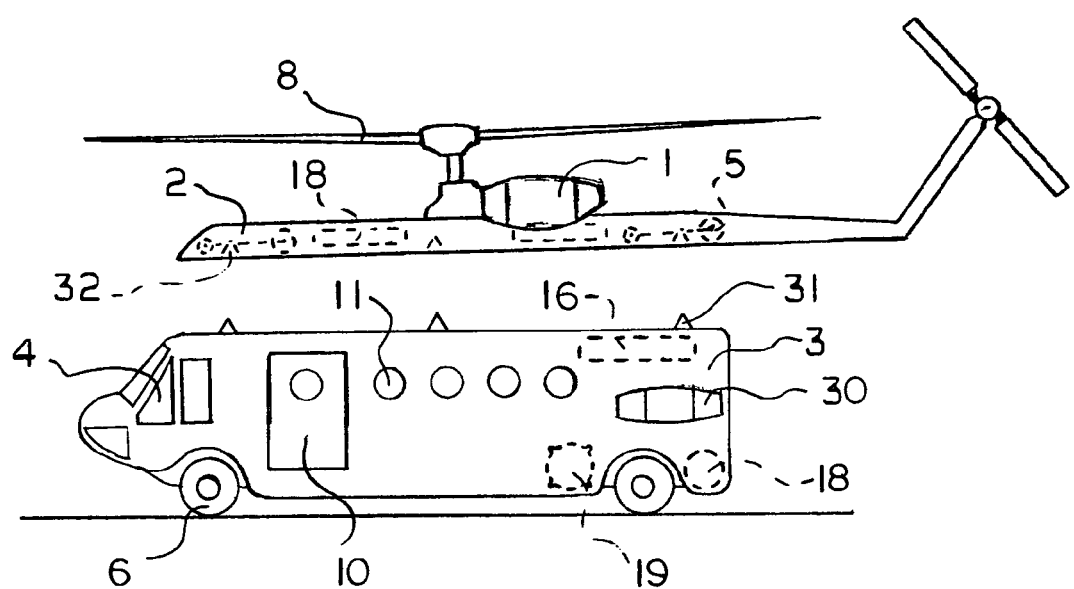
FIG. 9 is an elevational view of one embodiment of the invention illustrating an unmanned parent vehicle hovering above a modular cabin configured with wheels and a jet engine.

FIG. 9 illustrates an unmanned parent vehicle 2 hovering above a modular cabin. Remote control devices and positioning alignment devices enable the unmanned parent vehicle to lower downward onto the modular cabin and whereby the parent vehicle and cabin would then be engaged. Occupants can connect electrical connectors, mechanical connectors and static line for parachute recovery. Controls in the cockpit 4 of the modular cabin are available to operate the modular cabin 3 independently on the ground or water. Furthermore, other controls in the cockpit of the modular cabin are available to pilot the parent vehicle remotely or by direct link when the two components are mated.

The modular cabin may utilize aircraft engine 30 to provide propulsion on land, water and air. A modular cabin designed to be watertight and float upright can use engine 30 for propulsion on the water. On land, electric wheels 6 and engine 30 can provide maneuverability and high-speed road transportation. When in the air and operating as a MACH, engine 30 can provide additional forward thrust for increased speed.

Unmanned parent vehicle 2 illustrated in FIG. 9 contains recessed landing gear 5 to enable the parent vehicle to land without a modular cabin attached. This landing gear can be retracted for mating with a modular cabin. Electronic flight controls and position sensing equipment means located on the parent vehicle and modular cabin make it possible for the parent vehicle to mate with the modular cabin by remote control or autonomous means.

Robert Talmage, Jr. described a unique method of attachment/release for the Aircraft Escape Cabin, U.S. Pat. No. 6,776,373, issued Aug. 17, 2004. Talmage incorporates non-locking, one directional release, linking and stabilizing devices (male & female) with an attachment/release device. This concept works well for the MACH and is embodied herein as one preferred method of attachment.

To minimize the discomfort and destructive properties of aircraft vibrations, the MACH can take advantage of its unique configuration of two separate components connected together. Flexible attachment device 13 absorbs oscillating vibrations of the main rotor and insulating pad 33 located between the matting devices absorbs and dampens vibrations from the parent vehicle. This same vibration dampening means has a synergistic effect on the parent vehicle by softening and absorbing vibrations.

Figure 10:
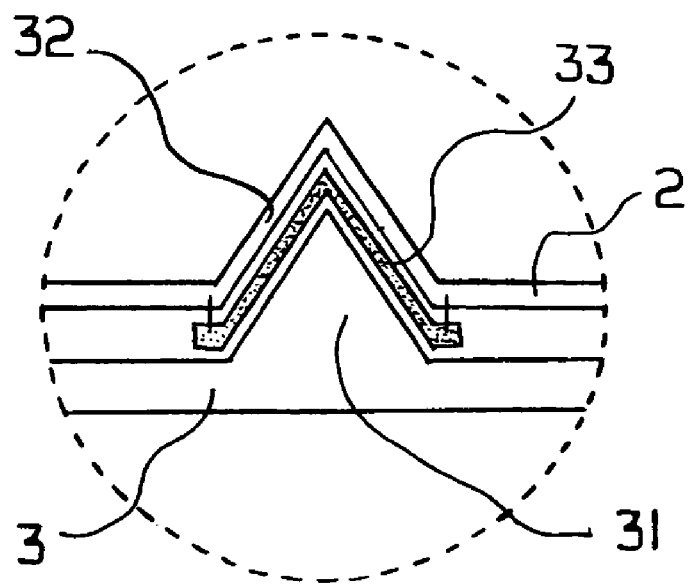
FIG. 10 is an enlarged cross-sectional view of the mating devices.

To further identify specific components, the nonlocking, one direction, linking and stabilization device described by Talmage is shown in FIG. 10 illustrating the Female Mating Device (FMD) 32 as part of the parent vehicle 2. Male Mating Device (MMD) 31 is shown as part of modular cabin 3. Insulating pad 33 is shown between FMD 32 and MMD 31. This insulating pad is an abrasive resistance foam-type material to absorb shock and vibrations. This insulating pad can be replaced when worn.

Figure 11:
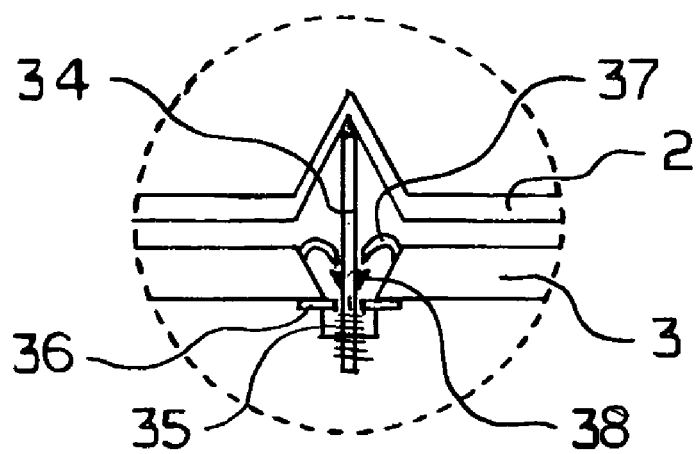
FIG. 11 is an enlarged cross-sectional section view of the attachment/release device.

FIG. 11 illustrates the Attachment/Release Device (ARD) 13. The ARD 13 is designed as a fail-safe flexible connection of the parent vehicle and the modular cabin. The flexibility is designed into explosive bolt 34 which can bend back and forth in lateral directions to allow for the slight movement permitted by the insulating pad 33. The modular cabin is not allowed to drop downward and is instead stabilized by nut 35 and washer 36.

The explosive charge in bolt 34 is located between strike 38 and nut 35. In this manner, when spring loaded latch 37 is retracted back and off of bolt 34, the ARD 13 will release modular cabin 3 when explosive bolt 34 is fired and separates the bolt.

A fail-safe feature is designed into ARD 13 to prevent separation of the modular cabin when the helicopter is operating below the minimum height above ground for safe deployment of parachute device 16. Below the safe height above ground for separation, a ground proximity sensor triggers an electrical solenoid to push spring-loaded latch 37 against the spring and into contact with bolt 34. This is the fail-safe position for latch 37 which will not allow the modular cabin to be released inadvertently.

The fail-safe mode is deactivated when the ground proximity sensor registers a safe height above ground for the parachute to deploy. At this time, the electrical solenoid is turned off which allows the spring to retract latch 37. With latch 37 retracted back from bolt 34, strike 38 is free and the modular cabin can separate in an emergency.

It will be understood by one skilled in the art that many variations, adaptations, or changes could be made to the disclosed preferred embodiment without departing from the spirit and scope of the present invention. For this reason, patent protection is not to be limited by or to what is illustrated herein and described above. Instead, patent protection is defined by the following claim or claims, properly interpreted according to accepted doctrines of claim interpretation, including the doctrine of equivalents and reversal of parts.

What is claimed is:

1. A method of transporting by air a variety of enclosed rigid modular cabins comprising:

a parent vehicle, said modular cabins attachable and detachable from said parent vehicle, said parent vehicle and said modular cabin combining through respective electrical connectors and attachment means to form an integrated composite aircraft, said parent vehicle being a common use rotary wing aircraft platform comprising aircraft propulsion means, fuel, main rotor, tail rotor, cockpit, flight controls, aircraft systems, avionics, electrical system and aircraft connectors, landing gear, and attachment and release means, said attachment and release means comprising a pair of complementary nonlocking mating devices attached respectively to said parent vehicle and said modular cabin, and said mating devices being held in place by a laterally flexible attachment and release device, said method of transporting said modular cabins comprising the steps of:
a. mating said parent vehicle and said modular cabin while on the ground by means of said nonlocking mating devices,
b. attaching said parent vehicle and said modular cabin by means of said laterally flexible attachment and release device,
c. connecting electrical and aircraft systems in said parent vehicle and said modular cabin with respective connectors to operate as a composite aircraft,
d. providing the power and lift means to control and fly said composite aircraft,
e. piloting said composite aircraft with an appropriate modular cabin to perform a specific flight mission,
f. landing said composite aircraft at desired location
g. disconnecting said electrical and aircraft connections between said parent vehicle and said modular cabin,
h. releasing said laterally flexible attachment and release device between said parent vehicle and said modular cabin,
i. separating said parent vehicle from said modular cabin, and
j. mating, connecting and operating said parent vehicle with another modular cabin.

2. The method of claim 1 wherein said attachment and release means comprises fail-safe means, said fail-safe means comprises a strike affixed to said explosive bolt and a spring-biased latch affixed to said modular cabin with a portion thereof overlapping said strike to prevent separation of said parent vehicle and said modular cabin, the method further comprising the steps of:
a. flying said composite aircraft above a predetermined altitude, and
b. deactivating said spring-biased latch such that it moves away from said strike to allow separation of said parent vehicle from said modular cabin in an emergency when said explosive bolt is released.

3. The method of claim 1 wherein said composite aircraft comprises a static line and parachute device,
wherein in an emergency the pilot may release said modular cabin by means of:
a. releasing said attachment and release device of said modular cabin,
b. displacing said modular cabin from parent vehicle by gravity,
c. pulling apart said electrical connectors by the separation of said modular cabin and parent vehicle,
d. extracting said parachute device from said modular cabin by said static line attached to said parent vehicle as it descends, and
e. deploying said parachute to safely decelerate said modular cabin to earth.

4. The method of claim 1 wherein said modular cabin comprises electrical power switching means, electrical system, respective connectors for connecting electrical systems to said parent vehicle, a generator device and fuel,
wherein the electrical system of said modular cabin can be powered from the parent vehicle or switched to receive power from said generator device comprising the steps of:
a. connecting said modular cabin to the parent vehicle electrical system through said respective electrical connectors,
b. positioning said power selection switch to receive electrical power from said parent vehicle,
c. generating electrical power from said parent vehicle through said electrical connectors and electrical power switching means to power said modular cabin,
d. starting said generator said in modular cabin,
e. positioning said power selection switch to receive power from said generator device and,
f. generating electrical power through said power selection switch to power the electrical system in said modular cabin.

5. The method of claim 1 wherein said parent vehicle comprises a winch, winch line, winch controls and said modular cabin comprises lifting tackle,
wherein the pilot of the parent vehicle releases and lowers said modular cabin, the method further comprising the steps of:
a. attaching said winch line to said lifting tackle,
b. releasing said attachment and release device to detach said modular cabin,
c. raising and lowering said winch line attached to said modular cabin to the desired length,
d. placing said modular cabin on the ground, and
e. releasing said winch line from said lifting tackle to release said modular cabin.

6. The method of claim 1 wherein said modular cabin is a sealed vessel to float on water and comprises independent propulsion means, wherein the pilot hovers the composite aircraft at the water surface, releases said modular cabin to float and maneuver on the water, the method further comprising the steps of:
a. piloting said composite aircraft to hover at the water surface,
b. releasing said modular cabin to float on the water,
c. piloting said parent vehicle to ascend and vertically separate from modular cabin, and
d. engaging said modular cabin independent propulsion means to maneuver said modular cabin on the water.

* * * * *